United States Patent
Latunde-Dada et al.

(10) Patent No.: US 11,113,362 B2
(45) Date of Patent: Sep. 7, 2021

(54) MULTICOMPONENT MODEL PARAMETERISATION

(71) Applicant: Malvern Panalytical Limited, Malvern (GB)

(72) Inventors: Seyi Latunde-Dada, Malvern (GB); Oksana Iryna Leszczyszyn, Malvern (GB); Karl Hampton, Malvern (GB); Rachel Bott, Malvern (GB)

(73) Assignee: Malvern Panalytical Limited, Malvern (GB)

( * ) Notice: Subject to any disclaimer, the term of this patent is extended or adjusted under 35 U.S.C. 154(b) by 514 days.

(21) Appl. No.: 15/561,219

(22) PCT Filed: Mar. 24, 2016

(86) PCT No.: PCT/GB2016/050841
§ 371 (c)(1),
(2) Date: Sep. 25, 2017

(87) PCT Pub. No.: WO2016/151331
PCT Pub. Date: Sep. 29, 2016

(65) Prior Publication Data
US 2018/0067901 A1    Mar. 8, 2018

(30) Foreign Application Priority Data
Mar. 24, 2015  (EP) .................................. 15160660

(51) Int. Cl.
*G06F 17/10*   (2006.01)
*G06F 17/18*   (2006.01)
(Continued)

(52) U.S. Cl.
CPC ............. *G06F 17/18* (2013.01); *G01N 13/00* (2013.01); *G06F 17/12* (2013.01); *G01N 2013/003* (2013.01)

(58) Field of Classification Search
CPC .......... G06F 17/12; G06F 17/18; G01N 13/00
(Continued)

(56) References Cited

U.S. PATENT DOCUMENTS

2003/0234356 A1*  12/2003  Konermann ........... G01N 13/00
                                                      250/281
2011/0264380 A1*  10/2011  Cottet .................. B01J 19/0053
                                                      702/25

(Continued)

FOREIGN PATENT DOCUMENTS

CN        103270403 A    8/2013
JP      2013-539047 A   10/2013
(Continued)

OTHER PUBLICATIONS

Cottet et al. (Taylor Dispersion analyhsis of Mixtures, (8pages). (Year: 2007).*

(Continued)

*Primary Examiner* — Andre Pierre Louis
(74) *Attorney, Agent, or Firm* — Morrison & Foerster LLP

(57) ABSTRACT

A method of estimating a parameter for fitting a multi-component Taylorgram model to Taylorgram data g(t) is disclosed. The data comprises a multi-component Taylorgram peak or front at t=t$_r$. The method comprises: evaluating a value of an integration or differential of the data; determining the parameter, based on an analytical expression that includes the value of the integral or differential of the data, the parameter corresponding with a physical property of a sample from which the Taylorgram data was obtained.

15 Claims, 11 Drawing Sheets

(51) Int. Cl.
*G01N 13/00* (2006.01)
*G06F 17/12* (2006.01)

(58) Field of Classification Search
USPC .............................................................. 703/2
See application file for complete search history.

(56) References Cited

U.S. PATENT DOCUMENTS

2013/0059313 A1* 3/2013 Jensen ................. G01N 33/536
435/6.15
2013/0186184 A1 7/2013 Goodall

FOREIGN PATENT DOCUMENTS

| WO | WO 2004/017061 | | 2/2004 |
|---|---|---|---|
| WO | 2012/046054 | A1 | 4/2012 |
| WO | 2014/001409 | A1 | 1/2014 |

OTHER PUBLICATIONS

Kelly, Brad et al., "Using Taylor dispersion profiles to characterize polymer molecular weight distributions," (2004) Phys. Chem. Chem. Phys., pp. 5523-5530.

Liu, Jun et al., "Reversible Self-Association Increases the Viscosity of a Concentrated Monoclonal Antibody in Aqueous Solution," (2005) Journal of Pharmaceutical Sciences, vol. 94, No. 9, pp. 1928-1940.

Callendar, Rachel et al., "Diffusion Coefficients for Binary, Ternary, and Polydisperse Solutions from Peak-Width Analysis of Taylor Dispersion Profiles," (2006) Journal of Solution Chemistry, vol. 35, No. 3, pp. 353-379.

Cottet, Herve et al., "Taylor Dispersion Analysis of Mixtures," (2007) Analytical Chemistry vol. 79, No. 23, pp. 9066-9073.

Saluja, Atul et al., "Nature and consequences of protein-protein interactions in high protein concentration solutions," (2008) International Journal of Pharmaceutics 358, pp. 1-15.

Cottet, Herve et al., "Determination of Individual Diffusion Coefficients in Evolving Binary Mixtures by Taylor Dispersion Analysis: Application to the Monitoring of Polymer Reaction," (2010) Analytical Chemistry, vol. 82, No. 5, pp. 1793-1802.

Hulse, Wendy et al., "A Taylor dispersion analysis method for the sizing of therapeutic proteins and their aggregates using nanolitre sample quantities," (2011) International Journal of Pharmaceutics 416, pp. 394-397.

Van Beers, Miranda M. C. et al., "Minimizing immunogenicity of biopharmaceuticals by controlling critical quality attributes of proteins," (2012) Biotechnology Journal 7, pp. 1-12.

Esfandiary, Reza et al., "A Systematic Multitechnique Approach for Detection and Characterization of Reversible Self-Association during Formulation Development of Therapeutic Antibodies," (2013) Journal of Pharmaceutical Sciences, vol. 102, pp. 3089-3099.

Ratanji, Kirsty D. et al., "Immunogenicity of therapeutic proteins: Influence of aggregation," Journal of Immunotoxicology, (2014) 11(2), pp. 99-109.

Latunde-Dada, Seyi et al., "Methodologies for the Taylor dispersion analysis for mixtures, aggregates and the mitigation of buffer mismatch effects," (2015) The Royal Society of Chemistry, Anal. Methods 7, pp. 10312-10321.

International Search Report dated May 23, 2016, directed to International Application No. PCT/GB2016/050841; 2 pages.

Office Action dated Jan. 14, 2020, directed to JP Application No. 2017-549599; 33 pages.

* cited by examiner

MULTICOMPONENT MODEL PARAMETERISATION

CROSS-REFERENCE TO RELATED APPLICATIONS

This application is a national phase filing under 35 USC § 371 of International Application No. PCT/GB2016/050841, filed on Mar. 24, 2016, and which claims priority to European Application No. 15160660.5, filed on Mar. 24, 2015, the contents of which prior applications are incorporated herein by reference.

FIELD OF THE INVENTION

The invention relates to a method and apparatus for determining parameters of a multicomponent Taylor dispersion.

BACKGROUND OF THE INVENTION

Taylor dispersion is a process by which shear flow is used to enhance the effective diffusivity of a sample. Laminar flow in a capillary results in a variation in flow velocity with radial location. Near the walls, the flow is substantially stationary, and flow velocity is at a maximum at the centre. This results in shearing of the adjacent lamina, which acts to enhance dispersion of a sample.

SUMMARY OF THE INVENTION

Taylor dispersion analysis (TDA) can be used to analyse properties of species within a sample. A plug of the sample may be injected into a microbore capillary and subsequently disperse as it traverses along the capillary within a laminar flow regime. The injected plug of the sample may be narrow (having a short duration) this being referred to as a pulse of the sample, or the injected plug of the sample may be long (having a longer duration) this being referred to as a slug of the sample. The degree of dispersion exhibited by the plug is dependent on the diffusivity of the molecules within the plug and can be measured at one or multiple points downstream of the injection site. A concentration detector, responsive to the species of the sample, may be positioned at one or more locations downstream of the injection location. The concentration detectors (e.g. a UV-Visible spectrometer) may thereby produce a signal that is proportional to the concentration of the molecules in each cross-section of the flow past the detector. The resultant signal from the detector, typically referred to as a Taylorgram, corresponds to a temporally-resolved distribution of molecular concentration whose width ($\sigma$) is related to the hydrodynamic radius ($R_h$) of the sample species. Two well-known Taylorgram profiles arise from the injection of a narrow plug (pulse) of the sample and the injection of a long plug (slug) of the sample. The Taylorgram profile which arises from a pulse containing a single component is given by the following Gaussian-analogue expression:

$$g = A \cdot \sqrt{\frac{t_r}{t}} e^{-0.5 \cdot \frac{t_r}{t} \cdot \left(\frac{t-t_r}{\sigma}\right)^2} \quad \text{(Equation 1)}$$

where $t_r$ is the residence time, which may be defined as the mean observation time of the sample at the detector (for a pulse Talyorgram), $\sigma$ is the width of the Taylorgram and A is the amplitude.

In the long-time limit of Taylor dispersion, this distribution approximates the Gaussian model:

$$g = A \cdot e^{-0.5 \cdot \left(\frac{t-t_r}{\sigma}\right)^2} \quad \text{(Equation 2)}$$

When a slug of the sample is injected (a relatively long duration plug of sample), a front is observed at the detection windows and the expression for the Taylorgram profile is:

$$g = A \cdot \left(0.5 \pm 0.5 \cdot \text{erf}\left(\sqrt{\frac{t_r}{t}} \cdot \frac{t-t_r}{\sigma}\right)\right) \quad \text{(Equation 3)}$$

For both injection types, the width $\sigma$ is related to the hydrodynamic radius of the sample species by Equation 4

$$R_h = \frac{4 k_B T \sigma}{\pi \eta r^2 t_r} \quad \text{(Equation 4)}$$

where $k_B$ is the Boltzmann constant, T is the temperature, $\eta$ is the buffer viscosity, r is the capillary radius and $t_r$ is the residence time of the sample in the capillary. Furthermore, the area under the Taylorgram is proportional to the concentration of the injected sample.

The width of the distribution can be determined most reliably by fitting an appropriate mathematical model to the experimental data. Providing that the residence time is sufficiently long to satisfy Taylor dispersion conditions, the distribution of a sample comprising a single component can be approximated by a Gaussian model (g):

$$g \approx A \cdot e^{-0.5 \cdot \left(\frac{t-t_r}{\sigma}\right)^2} \quad \text{(Equation 5)}$$

where the model parameters correspond to the maximum amplitude (A), residence time ($t_r$) and width of the distribution ($\sigma$). For a pulse (narrow sample plug) comprising two or more components, the resultant Taylorgram can be accurately modelled by the sum of overlapping Gaussian distributions. For example, the model for a sample mixture containing two components becomes:

$$g \approx g_1 + g_2 = A_1 \cdot e^{-0.5 \cdot \left(\frac{t-t_r}{\sigma_1}\right)^2} + A_2 \cdot e^{-0.5 \cdot \left(\frac{t-t_r}{\sigma_2}\right)^2} \quad \text{(Equation 6)}$$

where the fitting parameters correspond to the maximum amplitude (A), residence time ($t_r$) and width of the distribution ($\sigma$) and the subscripts 1 and 2 correspond to each of the two components.

Fitting algorithms may be used to provide functions which closely match the experimental data. To function, prior art fitting algorithms typically require seed parameters. These seed parameters act as initial estimates from which the fitting algorithm tries to determine the optimum solution. In general, the better the initial parameter estimates, i.e. the closer the initial estimates are to the optimal solution, the greater the probability of finding the optimal solution. The more unconstrained or random an initial estimate is, the higher the risk of finding spurious local minima leading to inaccurate or nonsensical solutions. For the one-component model (Equation 2), initial estimates for the model parameters $\sigma$, A and $t_r$ can be readily obtained from the Taylorgram itself; for example, from the width at half height, the maximum peak height and the time at maximum peak height. However, for the two-component model (Equation 3) the initial estimates are not as straightforward to derive, as there are now four unknown parameters: $A_1$, $A_2$, $\sigma_1$ and $\sigma_2$.

Taylor Dispersion Analysis has emerged as a potential technique for the absolute measurement of diffusion coefficients or hydrodynamic radii for a wide variety of materials, including biopharmaceutical products and their aggregates (W. Hulse, R. Forbes, *A Taylor dispersion analysis method for the sizing of therapeutic proteins and their aggregates using nanolitre sample quantities, Int. J Pharmacetics*, 2011, 416:394-397).

Reversible self-association of protein molecules in solution is a transitory aggregation process during which single protein molecules (monomers) associate to form multivalent structures (oligomers) through weak, non-covalent intermolecular bonding. In such interactions the individual monomers retain their native conformation (R. Esfandiary et al., *A systematic multitechnique approach for detection and characterisation of reversible self-association during formulation development of therapeutic antibodies, J. Pharm. Sci.*, 2013, 102(1): 62-72) and association of multiple monomers gives rise to oligomer populations of well-defined sizes, such as dimers or trimers. However, in instances where protein concentrations are high, the influence of protein-protein interactions becomes more significant and such reversible, low valence aggregates may act as precursors for the generation of larger, irreversible aggregates if the appropriate environmental conditions arise (A. Saluja and D. S. Kalonia, *Nature and Consequences of protein-protein interactions in high protein concentration solutions*, 2008, 358:1-15). Aggregates in biotherapeutic drug formulations have been shown to illicit life-threatening immunogenic responses (M. van Beers, M. Brdor, *Minimizing immunogenicity of biopharmaceuticals by controlling critical quality attributes of proteins, Biotechnol J.*, 2012, 7:1-12); change the bioavailability and, in turn, the efficacy of the drug (K. D. Ratanji et al, *Immunogenicity of therapeutic proteins: Influence of aggregation, J Immunotoxicol*, 2014, 11(2):99-109); and affect solution viscosity and other physical characteristics of the formulation (J. Liu et al., *Reversible self association increases the viscosity of a concentration monoclonal antibody in aqueous solution, J. Pharm. Sci.*, 2005, 94(9):1928-1940); all of which lead to manufacturing, regulatory and clinical issues. For the biopharmaceutical industry, the presence of reversible and/or irreversible aggregates in protein solutions, therefore, has potentially costly consequences.

Strategies that attempt to mitigate the occurrence of irreversible aggregates include (i) the engineering of aggregation-resistant proteins, (ii) the development of more physically stable formulations through solvent or excipient mediation and (iii) the control of the absolute amount of reversible aggregates in final formulations. In all of these approaches, the composition of the protein populations is the critical quality attribute and success, or quality, is measured by a demonstrable reduction of the proportion of reversible aggregates in the candidate or final formulations. Concomitantly, techniques that provide both qualitative and quantitative data regarding the composition of protein solutions are particular sought after; yet, relatively few techniques are capable of providing such information for bio-therapeutic formulations at all stages throughout the development pipeline.

Advantageously, TDA can be readily adapted for high-throughput biopharmaceutical screening since it may employ capillary electrophoresis equipment and a UV detector such as that described in WO2004/017061 and recently embodied in commercially available instrumentation (Viscosizer® 200, Malvern Instruments®). The use of microbore capillaries allows the consumption of only nanolitre quantities of sample material and the short path length extends the dynamic range of the instrumentation when coupled with UV detectors. This, together with the mechanics of the measurement means that, unlike size exclusion chromatography (SEC), no modifications to the sample are required prior to analysis. TDA has been shown to provide compositional information for (i) mixtures of polymers with a high polydispersity (R. Callendar and D. G. Leaist, *Diffusion Coefficients for Binary, Ternary, and Polydisperse Solutions from Peak-Width Analysis of Taylor dispersion profiles, J Sol Chem*, 2006, 35(3):353-379), (ii) mixtures containing one monodisperse and one polydisperse population (H. Cottet et al, *Determination of individual diffusion coefficients in evolving binary mixtures by Taylor dispersion analysis: application to the monitoring of polymer reaction, Anal. Chem.*, 2010, 82:1793-1802); and (iii) mixtures comprising two monodisperse components (R. Callendar et al, above).

The latter example is analogous to the situation that can arise in biopharmaceutical formulations whereby the sample comprises a mixture of components, typically monomer and dimer, which are monodisperse with respect to size. TDA has the potential to extract compositional data for intact biopharmaceutical formulations and has several methodological advantages over existing techniques.

Current methods for the analysis of multi-component Taylorgrams are:

a) Obtaining the average (and not the individual) diffusion coefficient of the components using the moment method (H. Cottet et al, *Taylor dispersion analysis of mixtures. Anal Chem* 2007, 79(23): 9066-9073, B. Kelly and D. G. Leaist, *Using Taylor dispersion profiles to characterize polymer molecular weight distributions. Phys. Chem. Chem. Phys.*, 2004, 6, 5523-5530).

b) Computing the average (and linear combinations) of the diffusion coefficients at fractional heights of the Taylorgram (R. Callendar et al, above).

c) Calculating the degree of polymerization in a mixture using the area, height and variance of a Taylorgram.

d) Fitting sums of Gaussian functions to the Taylorgrams with pseudo-random initial parameter estimates (e.g. as described for binary mixtures in Cottet et al, above)

e) Analysing the reduced signal obtained from the deconvolution of a Taylorgram. This involves subtracting the contribution of a known component from the global Taylorgram of the mixture (as described in Cottet et al, above).

Despite the promise of TDA as a method of characterising mixtures of components (e.g. arising during protein aggregation), there is currently no methodology that provides initial estimates for a multi-component model using data intrinsic to the distribution in question. More specifically, there is no prior art methodology for parameterisation of multi-component models in all the conditions given below:
1) Two component mixtures, where:
   a) the two-components are unrelated; or
   b) the size of one component is known; or
   c) a two-component mixture of unrelated components but where the smaller component's absorbance signature is small and differs in sign to the larger component's signature. (This typically occurs when the sample buffer and run buffer differ in concentration).
2) A two or three-component mixture where the components are related (e.g. monomer, dimer and trimer) but the size and proportion of the components is not known.
3) The individual sizes of all components in a two- three- or four-component mixture are known but their proportions within the mixture are not, or vice versa.

Such a methodology could pave the way for more accurate, reproducible and robust deconvolution of the hydrodynamic radii and composition of Taylorgrams generated by sample mixtures and make TDA a more viable option for the characterisation of aggregates (e.g. reversible aggregates) in biopharmaceutical formulations.

According to an aspect of the invention, there is provided a method of using a computer to estimate a physical property of a component of a sample from Taylorgram data obtained from the sample, by:
  fitting a multi-component Taylorgram model to the Taylorgram data g(t), the Taylorgram data comprising a multi-component Taylorgram peak or front at $t=t_r$; the fitting comprising:
  evaluating a value of an integration or differential of the data;
  determining the parameter of a component of the multi-component Taylorgram model, based on an analytical expression that includes the value of the integral or differential of the data.

The physical property may be hydrodynamic radius.

The method may further comprise performing a Taylor dispersion to obtain the Taylorgram data.

According to an aspect of the invention, there is provided a method of estimating a parameter for fitting a multi-component Taylorgram model to Taylorgram data g(t), comprising a multi-component Taylorgram peak or front at $t=t_r$; the method comprising:
  evaluating a value of an integration or differential of the data;
  determining the parameter of a component of the multi-component Taylorgram model, based on an analytical expression that includes the value of the integral or differential of the data, the parameter corresponding with a physical property of a component of the sample from which the Taylorgram data was obtained.

The Taylorgram peak may be substantially centred at $t=t_r$.

The Taylorgram model may comprise a Gaussian distribution, or may comprise an error function.

The applicant has appreciated that integrating or differentiating Taylorgram data comprising a multi-component Taylorgram peak or front provides information that can be used to accurately estimate parameters of a model component, the parameters representing physical properties of a sample component. To the extent that previous techniques may have determined a differential or integral based on the Taylorgram data and used this to estimate a model parameter, such parameters have corresponded with the average physical properties of the sample, rather than the properties of a component thereof.

Evaluating a value of an integration or a differential of the Taylorgram data may comprise evaluating a first differential, second differential (e.g.

$$\frac{d_2 g(t)}{dt^2}\Big),$$

third differential (e.g.

$$\frac{d_3 g(t)}{dt^3}\Big)$$

or any order (n) differential (e.g.

$$\frac{d_n g(t)}{dt^n}\Big)$$

of the data. Evaluating a value of an integration or a differential of the data may comprise evaluating a first integral ($\int g(t)dt$), second (double) integral ($\iint g(t)dt^2$), third (triple) integral ($\iiint g(t)dt^3$) or any order (n) integral of the data.

The method may comprise evaluating, based on the data, at least two values selected from:
  x, a value of the data at $t=t_r$;
  y, a value of a second differential of the data, $$\frac{d_2 g(t)}{dt^2},$$

at $t=t_r$;
  z, a value derived from an integration of the data, $\int g(t)dt$, starting or ending at $t=t_r$; and
  u, a value of an integration of the integration of the data, $\iint g(t)dt^2$, starting or ending at $t=t_r$; and then
  determining an estimate for the parameter, wherein determining the estimate comprises solving at least two simultaneous equations, the simultaneous equations each respectively comprising one of the evaluated values.

The number of simultaneous equations that are required to determine the parameter depends on how many of the model parameters may be known (or estimated) based on a priori knowledge. Where there are only two unknowns, two equations can be used.

The multi-component Taylorgram model may be of the general form:

$$g_{model\_pulse}(t) = \sum_{i=1}^{n} A_i \cdot e^{-0.5 \cdot \left(\frac{t-t_r}{\sigma_i}\right)^2}$$

or of the general form:

$$g_{model\_slug}(t) = \sum_{i=1}^{n} A_i \cdot \left(0.5 \pm 0.5 \cdot erf\left(\sqrt{\frac{t_r}{t}} \cdot \frac{t-t_r}{\sigma_i}\right)\right)$$

and the parameter may be selected from $A_i$ and $\sigma_i$.

The simultaneous equations may comprise at least two of:

$$x = \sum_{i=1}^{n} A_i;$$

$$y = -\frac{d_2 g(t)}{dt^2} = \sum_{i=1}^{n} \frac{A_i}{\sigma_i^2};$$

$$z = \sqrt{\frac{2}{\pi}} I = \sum_{i=1}^{n} A_i \sigma_i,$$

where I is a value of the integration of the data, $\int g(t)dt$, starting or ending at $t=t_r$; and $$u = \sum_{i=1}^{n} A_i \sigma_i^2.$$

The model may comprise a two-component Taylorgram model, and at least one of the following conditions may be met:
  none of $A_1$, $A_2$, $\sigma_1$, $\sigma_2$ are known before the parameter is estimated;
  one of $\sigma_1$ and $\sigma_2$ are known, and none of the remaining parameters $A_1$, $A_2$, $\sigma_1$, $\sigma_2$ are known before the parameter is estimated;
  the second component has a negative amplitude $A_2$, and the amplitude of the second component $A_2$, is smaller than the amplitude of the first component $A_1$.

The model may comprise a two or three component Taylorgram model, wherein a relationship between the values of $\sigma_i$ for the sample is known, and wherein the absolute values of $A_i$ and $\sigma_i$ for the sample are not known, and the ratio between the values of $A_i$ for the sample is not known.

The model may comprise a two, three or four component Taylorgram model, wherein the values $\sigma_i$ for the sample are each known but the values of $A_i$ for the sample are not known.

The integration for evaluating z and/or u may start at $t=0$ and ends at $t=t_r$. Equally, the integration for evaluation z may start at $t=t_r$ and end at $t=t_{end}$ where $t_{end}$ is the end time of the Taylorgram data. The integration may have a first end point at $t=t_r$ and a second end point at any time where the Taylorgram value has substantially returned to the baseline.

The method may comprise:
  determining a maximum value, w, of a differential of the data, $$\frac{dg(t)}{dt},$$

and a t value t' corresponding with the maximum value, w; and
  determining the parameter from the values w, t' and $t_r$.

This approach may be particularly appropriate where the Taylorgram comprises two components, and where the second component is relatively small in amplitude compared with the first component, for example where the second component results from a mismatch between the sample buffer and the run buffer.

The Taylorgram model may be of the general form:

$$g_{model}(t) = \sum_{i=1}^{2} A_i \cdot e^{-0.5 \left(\frac{t-t_r}{\sigma_i}\right)^2};$$

The parameter may be selected from $A_i$ and $\sigma_i$.

The second component may have negative amplitude $A_2$, and the magnitude of the amplitude of the second component $A_2$, may be smaller than the magnitude of the amplitude of the first component $A_1$.

This may correspond with a buffer mismatch between a sample buffer and a run buffer, such that the reduced absorption of the sample buffer results in a negative component in the Taylorgram. Such contributions have hitherto been difficult to de-convolve from the Taylorgram data so as to produce reliable estimates for the a component (or components) of the sample.

The parameter may be determined based on at least one of the expressions:

$$w = \frac{A_1}{\sigma_1} e^{-0.5}; \text{ and } t' = t_r \pm \sigma_1.$$

A further parameter of the model may be determined based on at least one of the expressions:

$$z = \frac{A_1}{\sigma_1^2} + \frac{A_2}{\sigma_2^2}, \text{ and } x = A_1 + A_2.$$

According to a second aspect of the invention, there is provided a method of estimating a parameter for fitting a two-component Taylorgram model to data g(t), the data being a Taylorgram comprising a multi-component Taylorgram peak or front at $t=t_r$, the method comprising:
  performing a least squares fit of a single component Taylorgram model to the data g(t);
  determining the parameter by finding a root of a cubic equation, the cubic equation derived from: an analytical expression for the integrated residual squared error, $R^2$, resulting from a fit of a one-component Taylorgram model to a two-component Taylorgram; and a priori knowledge of the standard deviation, a, of a dominant Taylorgram component of the data g(t);
  the parameter corresponding with a physical property of a component of the sample from which the Taylorgram data was obtained.

The two-component Taylorgram model may be of the general form:

$$g_{model}(t) = \sum_{i=1}^{2} A_i \cdot e^{-0.5 \left(\frac{t-t_r}{\sigma_i}\right)^2};$$

and
the cubic equation may be:

$$a \cdot s_2^3 + b \cdot s_2^3 + c = 0, \text{ where}$$

$$s_2 = \frac{\sigma_2}{\sqrt{\sigma_2^2 + \sigma_s^2}};$$

$$a = 2\left(A_{peak}\frac{\sigma_1}{\sqrt{\sigma_1^2 + \sigma_s^2}} - A_s\right);$$

$$b = A_s - 2A_{peak}\left(\frac{\sigma_1}{\sqrt{\sigma_1^2 + \sigma_s^2}}\right)^3; \text{ and}$$

$$c = A_s\left(2\left(\frac{\sigma_1}{\sqrt{\sigma_1^2 + \sigma_s^2}}\right)^3 - \frac{\sigma_1}{\sqrt{\sigma_1^2 + \sigma_s^2}}\right).$$

The method may further comprise determining a hydrodynamic radius of a component of the sample, a concentration of a sample component, or a ratio of concentrations of a first and second sample component.

According to another aspect, there is provided a computer readable medium, containing a set of instructions that are operable to cause a computer to perform a method according to an aspect of the invention.

According to another aspect, there is provided an apparatus comprising a computer or a processor, configured to perform a method according to an aspect of the invention.

The computer may comprise output means (e.g. a display or printer), for providing parameter estimates to a user. The computer may comprise input means (e.g. keyboard or mouse), for controlling the computer (e.g. selecting the parameters to be determined, inputting any a priori knowledge relating to the components).

The apparatus may further comprise an instrument for performing a Taylor diffusion analysis, so as to obtain the data. The instrument may comprise a capillary, a pump, a sample injection means and a detector. The sample injection means may be configured to inject the sample into a run liquid within the capillary. The pump may be configured to drive the run liquid and sample through the capillary at a predetermined rate, or with a predetermined pressure. The detector may be configured to produce a signal that is proportional to the concentration of molecules (or particles) in the flow past the detector. The detector may comprise a UV-Visual spectrometer, a photodiode and/or a focal plane array.

According to another aspect, there is provided a method of analysing protein aggregation comprising using a method according to an aspect of the invention.

According to another aspect, there is provided a method of preparing a product, comprising using a method according to an aspect of the invention, or an apparatus according to an aspect of the invention, to investigate a level of aggregation of a component of the product.

According to another aspect, there is provided a product produced according to a method in accordance with an aspect of the invention.

According to another aspect, there is provided an apparatus for preparing a product, comprising a product preparing means (e.g. a reactor) and an instrument. The instrument is configured to sample the product output from the product preparing means and to perform a Taylor dispersion analysis to estimate a physical parameter of a component of the product (e.g. to determine a degree of aggregation of the component). An output from the instrument is used to adjust an operating parameter of the product preparing means so as to maintain the physical parameter (e.g. degree of aggregation) within a predetermined range.

Optional features of each aspect may be combined with optional features of any other aspect.

BRIEF DESCRIPTION OF THE DRAWINGS

Embodiments will be described in more detail, purely by way of example, with reference to the accompanying drawings, in which.

DETAILED DESCRIPTION OF THE INVENTION

In the long time limit of Taylor dispersion, the resultant Taylorgram obtained from a pulse Taylorgram comprising a mixture of n non-interacting components can be approximated by:

$$g = \sum_{i=1}^{n} A_i \cdot e^{-0.5\left(\frac{t-t_r}{\sigma_i}\right)^2} \quad \text{(Equation 7)}$$

where $A_i$ and $\sigma_i$ are the respective amplitudes and Taylorgram widths for the i to n components, $t_r$ is the residency time of the mixture at the observation point and t is the time.

The value of the Taylorgram x at $t=t_r$ (i.e. the time of the peak in FIG. 1) is therefore approximated by:

$$x = \sum_{i=1}^{n} A_i \quad \text{(Equation 8)}$$

Figure 1:
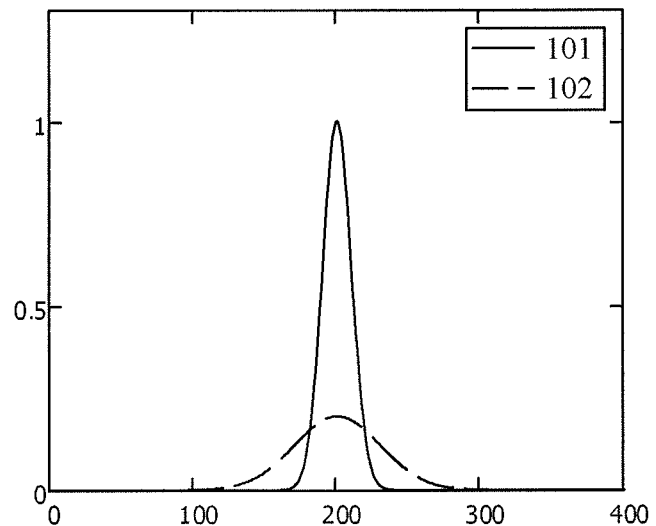
FIG. 1 is a graph of the constituent components of a two-component Gaussian Taylorgram model with $t_r=200$, $\sigma_1=10$ s, $\sigma_2=30$ s, $A_1=1$ $A_2=0.2$.

Referring to FIG. 1, a first Gaussian distribution 101 and a second Gaussian distribution 102 are shown, corresponding with a Taylorgram resulting from a mix of two components having different hydrodynamic radius, resulting in a different Gaussian width (or standard deviation), $\sigma$. In this example the parameters of the first Gaussian (denoted by a subscript '1') are a resistency time, $t_r=200$, a first width $\sigma_1=10$ s, a second width $\sigma_2=30$ s, a first amplitude $A_1=1$, and a second amplitude $A_2=0.2$.

Figure 2:
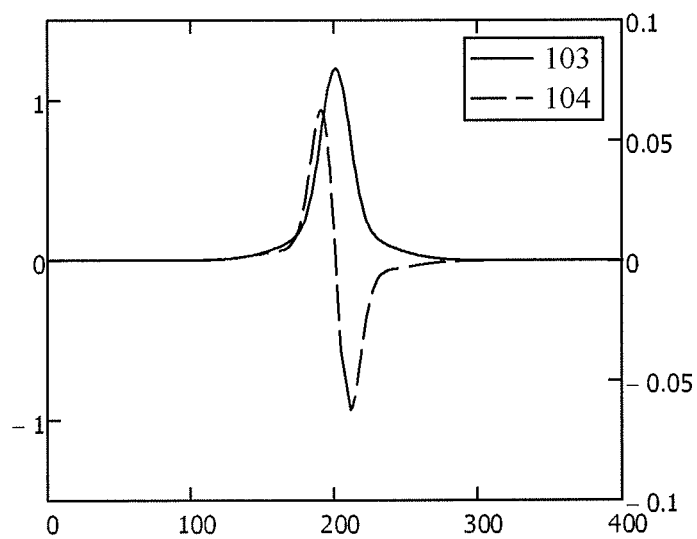
FIG. 2 is a graph of the two-component Gaussian model of FIG. 1 with the first differential thereof.
Figure 3:
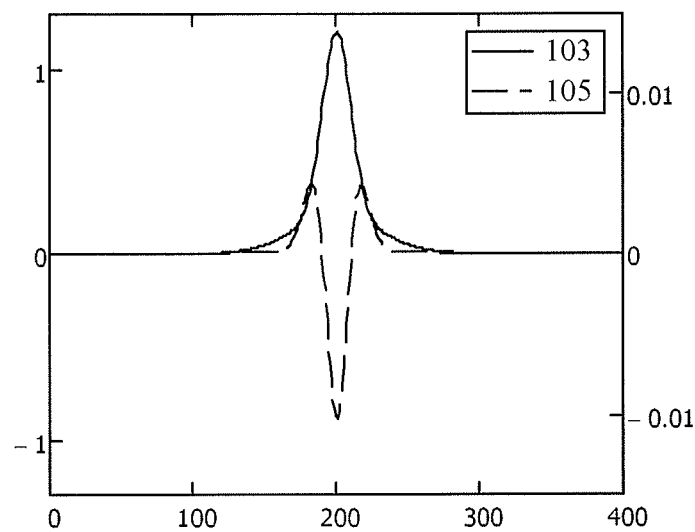
FIG. 3 is a graph of the two-component Gaussian model of FIG. 1 with the second differential thereof.

FIG. 2 shows the combined model 103, this being the sum of the two Gaussians 101, 102, along with the differential (with respect to time, t) 104 of the combined model 103. FIG. 3 shows the second differential 105 of the model 103.

The value of the second differential 105 of a multicomponent Gaussian of the form given in Equation 7 can be evaluated at $t=t_r$ to give y, as:

$$y = \frac{d_2 g}{dt^2} = \sum_{i=1}^{n} \frac{A_i}{\sigma_i^2} \quad \text{(Equation 9)}$$

Figure 4:
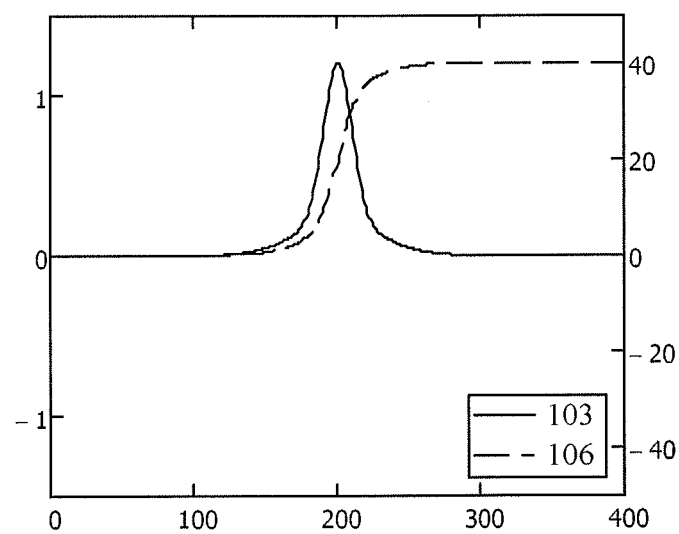
FIG. 4 is a graph of the two-component Gaussian model of FIG. 1 with an integration thereof.

FIG. 4 shows an integration 106 of the model 103. The value, I, of an integration 106 of a model of the form given in Equation 7 can be evaluated to give z as:

$$z = \sqrt{\frac{2}{\pi}} I = \sum_{i=1}^{n} A_i \sigma_i \quad \text{(Equation 10)}$$

Figure 5:
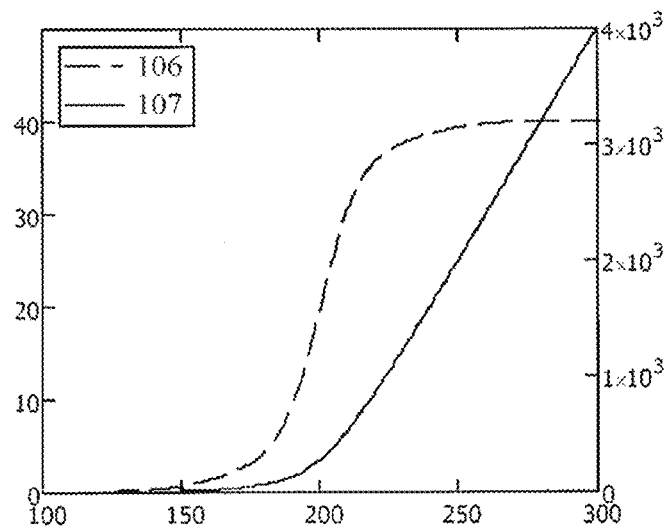
FIG. 5 is a graph of the integration of FIG. 4 with an integration of the integration of FIG. 4 (i.e. a double integration of the model)

FIG. 5 shows an integration 107 of the integration 106 (i.e. a double integration of the model 103). The value of the integration of an integration of the model of the form given in Equation 7 can be evaluated to give u as:

$$u = I_2 = \sum_{i=1}^{n} A_i \sigma_i^2 \quad \text{(Equation 11)}$$

The four equations (Equations 9-11) provide simultaneous equations in the amplitudes, A, and widths, $\sigma$, which can be solved for mixtures with differing numbers of components.

From the widths of the individual distributions, the hydrodynamic radii can be determined for the individual components. Furthermore, with knowledge of the extinction coefficient of each component (relating the reading at a concentration sensor to a concentration of the component in question), the proportion of each component in the mixture can be estimated by computing the area under each individual Taylorgram component.

Although this example has dealt with the case where the sample plug is injected as a pulse (with short duration), the skilled person will appreciate that a similar set of simultaneous equations can be written for the case where the sample plug is injected as a slug (with longer duration). Equations analogous to Equations 9-11 can be written, based on Equation 3, which describes a slug Taylorgram, rather than based on Equation 2, describing a pulse Taylorgram).

Figure 6:
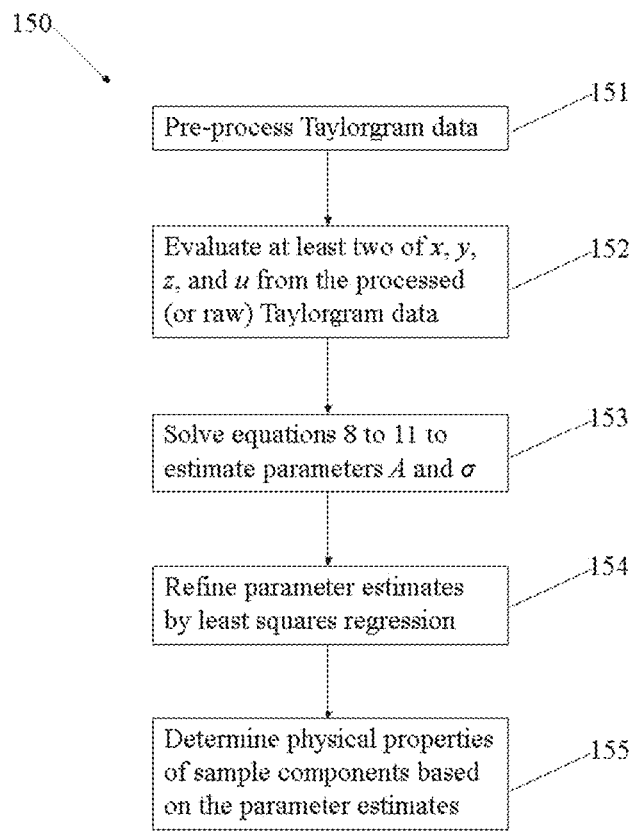
FIG. 6 is a flow diagram of a method in accordance with an embodiment.

Referring to FIG. 6, a flow diagram 150 illustrating the method is shown, comprising the steps:

151, optionally, pre-process Taylorgram data (e.g. by moving average filter);

152, evaluate at least two of x, y, z, and u from the processed (or raw) Taylorgram data;

153, solve equations 8 to 11 to estimate parameters A and $\sigma$;

154, optionally, refine parameter estimates by least squares regression

155, optionally, determine physical properties of sample components based on the parameter estimates.

Illustrative methods of estimating parameters for fitting multi-component models to Taylorgram data will be disclosed that address each of the cases mentioned in the background of the invention.

Each of these methods can be used to analytically calculate estimates for model parameters that fit the Taylorgram data. The parameter estimates may be used as starting points for further regression analysis, intended to tweak the parameters so as to minimise an error function determined with reference to the model and the data. For instance, the initial parameter estimates may be provided as an input to a least squares regression that adjusts the parameters to minimise the sum of the squares of the error. In some circumstances, the parameter estimates may be sufficiently accurate to be used without further regression analysis to determine properties of the sample from which the data was obtained (e.g. hydrodynamic radius or concentration).

In some embodiments, pre-processing of Taylorgram data before the parameter estimates are generated may be desirable. For example, a detector of the instrument used to perform the analysis may be subject to baseline drift. This may be corrected, for example by fitting a linear function to the baseline data, and correcting the raw Taylorgram based on the linear function. In addition or alternatively, the raw Taylorgram may be subjected to a filtering or smoothing operation to remove or attenuate high frequency components. For example a moving average filter may be applied (e.g. a Savitzky-Golay filter), or a spline fit made to the data, or some other smoothing/filtering technique applied.

Two Component Mixture of Unrelated Components

In this case, none of $A_1, A_2, \sigma_1, \sigma_2$ are known a priori. The four equations (Equations 8 to 11) reduce to:

$$x = A_1 + A_2 \quad \text{(Equation 12)}$$

$$y = \frac{A_1}{\sigma_1^2} + \frac{A_2}{\sigma_2^2} \quad \text{(Equation 13)}$$

$$z = A_1\sigma_1 + A_2\sigma_2 \quad \text{(Equation 14)}$$

$$u = A_1\sigma_1^2 + A_2\sigma_2^2 \quad \text{(Equation 15)}$$

Solving the four equations (12 to 15) simultaneously gives:

$$\sigma_1 = 0.5\left(wk + \sqrt{(wk)^2 - 4k}\right) \quad \text{(Equation 16)}$$

$$\sigma_2 = \frac{k}{\sigma_1} \quad \text{(Equation 17)}$$

$$A_2 = \frac{z - \sigma_1 x}{\sigma_2 - \sigma_1} \quad \text{(Equation 18)}$$

$$A_1 = x - A_2 \quad \text{(Equation 19)}$$

where $$w = \sqrt{\frac{yu - x^2}{ux - z^2}} \quad \text{(Equation 20)}$$

$$k = \frac{u}{zw - x} \quad \text{(Equation 21)}$$

Using these equations, the four unknown parameters can be estimated. In cases where the two widths $\sigma_1$, $\sigma_2$ are similar in magnitude, it is possible to obtain unphysical solutions to these equations. To alleviate this, the values of w and k can be varied (for instance by pseudorandom amounts) until physical solutions are obtained.

Two Component Mixture Where the Size of One of the Components is Known a Priori In one embodiment, the width $\sigma_1$ of the known component can be determined from the size by rearranging Equation 1. In doing so, one of the four unknown parameters has been determined a priori and any three of the four equations (Equation 12-15) presented above can be used to obtain initial estimates for the remaining parameters. There are four such combinations of three equations which can be used.

In an alternative embodiment, a least squares fitting method finds the best fit to a given set of data points which minimizes the sum of the squares of the offsets (residuals) of the data points from the fit. For example, for the set of data $y_i$, the best fit function $f(t, a_1 \ldots a_n)$, which varies with time t and parameters $a_1 \ldots a_n$, is the one which minimizes the sum of the residuals, $R^2$ given by:

$$R^2 = \Sigma[y_i - f(t, a_1, \ldots, a_n)]^2 \quad \text{(Equation 22)}$$

A least squares fit of a single Gaussian distribution to a two-component pulse Taylorgram (Equation 6) therefore finds the solution which minimizes the residuals $R^2$ given by:

$$R^2 = \sum\left[A_s \cdot e^{-0.5\left(\frac{t-t_r}{\sigma_s}\right)^2} - \sum_{i=1}^{2} A_i \cdot e^{-0.5\left(\frac{t-t_r}{\sigma_i}\right)^2}\right]^2 \quad \text{(Equation 23)}$$

where $A_s$ and $\sigma_s$ are the amplitude and the width of the fitted Gaussian respectively.

This sum can be estimated as an integral over time to give:

$$R^2 = \sqrt{\pi}\left[A_s^2\sigma_s + 2A_1A_2\frac{\sigma_1\sigma_2}{\sqrt{\sigma_1^2 + \sigma_2^2}} + \sum_{i=1}^{2}\left(A_i^2\sigma_i - 2A_iA_s\frac{\sigma_i\sigma_s}{\sqrt{\sigma_i^2 + \sigma_s^2}}\right)\right] \quad \text{(Eq. 24)}$$

To find the minimum, Equation 24 may be differentiated with respect to $A_s$ and $\sigma_s$ and equated to zero to give the following simultaneous equations:

$$0 = A_s - \sum_{i=1}^{2}\frac{A_i\sigma_i}{\sqrt{\sigma_i^2 + \sigma_s^2}} \quad \text{(Equation 25)}$$

$$0 = A_s^2 - \sum_{i=1}^{2}\frac{2A_i\sigma_i^3}{(\sigma_i^2 + \sigma_s^2)^{3/2}} \quad \text{(Equation 26)}$$

Given a priori knowledge of the hydrodynamic radius of component 1 (and hence $\sigma_1$) and since the peak height of the Taylorgram, $A_{peak}$, is equal to the sum of $A_1$ and $A_2$, equations 25 and 26 can be solved simultaneously to give $\sigma_2$ (and hence the second hydrodynamic radius) as the solution of the cubic equation:

$$a \cdot s_2^3 + b \cdot s_2 + c = 0 \quad \text{(Equation 27)}$$

where $$s_2 = \frac{\sigma_2}{\sqrt{\sigma_2^2 + \sigma_s^2}} \quad \text{(Equation 28)}$$

$$a = 2\left(A_{peak}\frac{\sigma_1}{\sqrt{\sigma_1^2 + \sigma_s^2}} - A_s\right) \quad \text{(Equation 29)}$$

$$b = A_s - 2A_{peak}\left(\frac{\sigma_1}{\sqrt{\sigma_1^2 + \sigma_s^2}}\right)^3 \quad \text{(Equation 30)}$$

$$c = A_s\left(2\left(\frac{\sigma_1}{\sqrt{\sigma_1^2 + \sigma_s^2}}\right)^3 - \frac{\sigma_1}{\sqrt{\sigma_1^2 + \sigma_s^2}}\right) \quad \text{(Equation 31)}$$

$A_1$ and $A_2$ (and hence the relative proportions of the two components in the sample from which the Taylorgram has been obtained) can then be determined by substitution into Equations 25 and 27.

Although the example above has again been illustrated with respect to a pulse Taylorgram, the skilled person will appreciate that a similar approach can be applied to the case where the Taylorgram mode corresponds with a slug Taylorgram (as described by Equation 3).

Figure 7:
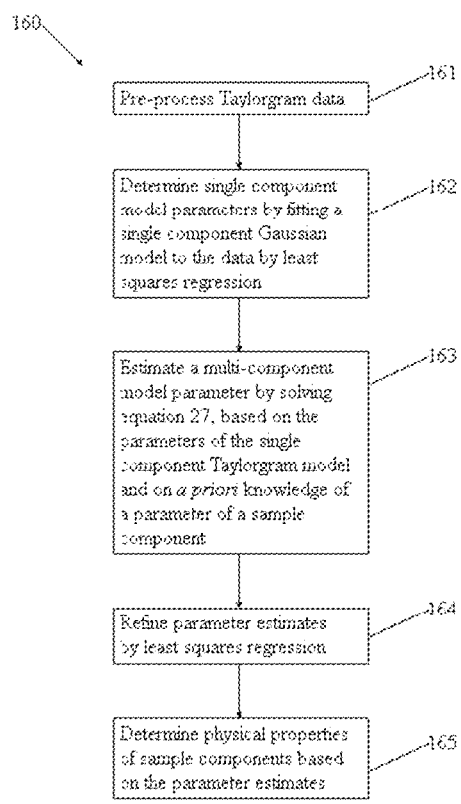
FIG. 7 is a flow diagram of a method in accordance with another embodiment.

Referring to FIG. 7 a flow diagram 160 is shown, illustrating the method, comprising the steps:
161, optionally, pre-process Taylorgram data (e.g. by moving average filter);
162, determine single component model parameters by fitting a single component Gaussian model to the data by least squares regression,
163, estimate a multi-component model parameter by solving equation 27, based on the parameters of the single component Taylorgram model and on a priori knowledge of a parameter of a sample component;
164, optionally, refine parameter estimates by least squares regression;
165, optionally, determine physical properties of sample components based on the parameter estimates.

Figure 8:
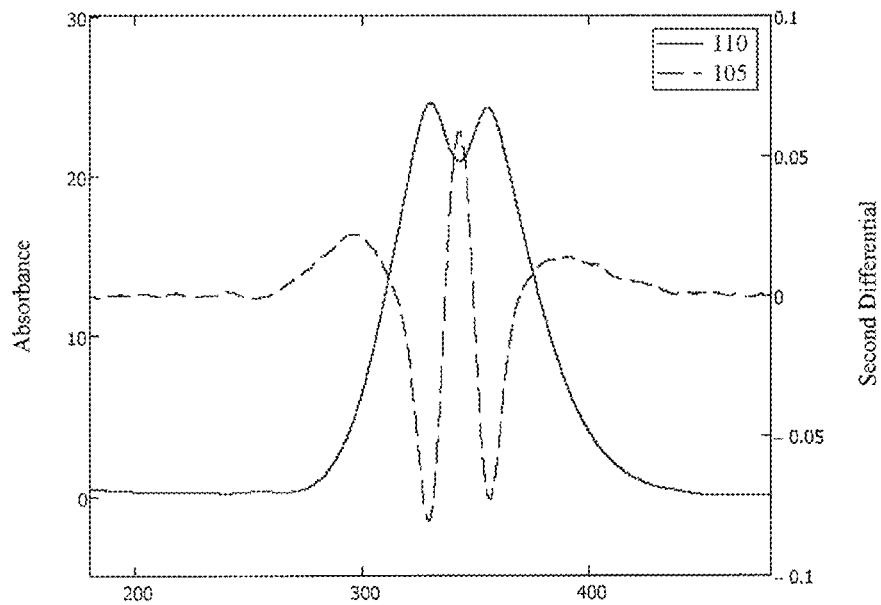
FIG. 8 is graph of: Taylorgram data for a sample comprising bovine serum albumin (BSA) and acetic acid, in which there is a mismatch in buffer concentration between the sample buffer and run buffer; and the second differential of the Taylorgram data.

Two Component Mixture Where the Second Component Has a Smaller Amplitude Which Differs in Sign to the Amplitude of the First Component Such a scenario can arise in situations where there a mismatch between the sample and run buffers, and may arise as a result of evaporation, sample mishandling or when sample/buffer components change during storage. The effect of a mismatch between the sample and run buffers on the resulting Taylorgram data is illustrated in FIG. 8. In this example, the concentration of sample buffer is lower than that of the run buffer, which manifests as a negative contribution to the concentration profile.

In this case, we are considering a mixture of two components that are unrelated i.e. the sample and the sample buffer. The application of a two-component model is required so that the true width of the sample can be extracted.

FIG. 8 shows an example of pulse Taylorgram data 110 obtained under conditions where a mismatch in the sample buffer and run buffer has resulted in a second Taylorgram component with a negative amplitude. In the case, the sample comprises BSA/Acetic acid. The BSA produces the first Taylorgram component in the Taylorgram data 110, and the buffer mismatch results in a second Taylorgram component in the data 110 with a negative amplitude.

As for any mixture of two components, there are four unknown parameters: $A_1$, $A_2$, $\sigma_1$ and $\sigma_2$ and thus four equations are required in order to estimate the initial guesses for the fitting algorithm. The first equation can be obtained from the value of the absorbance x at the dip in the trace i.e. at $t \sim t_r$.

$$x = A_1 + A_2 \quad \text{(Equation 12)}$$

The second and third equations are obtained from the maximum absolute value w of the differential of the profile. For a single component fit, this has an absolute value of:

$$w = \frac{A}{\sigma} e^{-0.5} \quad \text{(Equation 31)}$$

For a profile displaying a buffer mismatch, w is dominated by the sample component and hence can be approximated by:

$$w = \frac{A_1}{\sigma_1} e^{-0.5} \quad \text{(Equation 32)}$$

The location of the maximum absolute value of the single component fit is given by:

$$t' = t_r \pm \sigma_1 \quad \text{(Equation 33)}$$

Since the first component is dominant, the value of t' from Equation 33 approximates the time of the maximum value of w for the two component Taylorgram data.

At the dip in the trace (corresponding with $t = t_r$), the second differential 105 is non-zero and positive as shown in FIG. 8 (it would be negative at $t = t_r$ for a single component trace). The value y is given by:

$$y = \frac{A_1}{\sigma_1^2} + \frac{A_2}{\sigma_2^2} \quad \text{(Equation 13)}$$

Both $A_1$ and $\sigma_1$ are determinable using only Equation 30 and Equation 31. Once estimates for these parameters have been obtained, it is straightforward to obtain estimates for $A_2$ and $\sigma_2$ from Equation 12 and Equation 13 by direct substitution.

Figure 9:
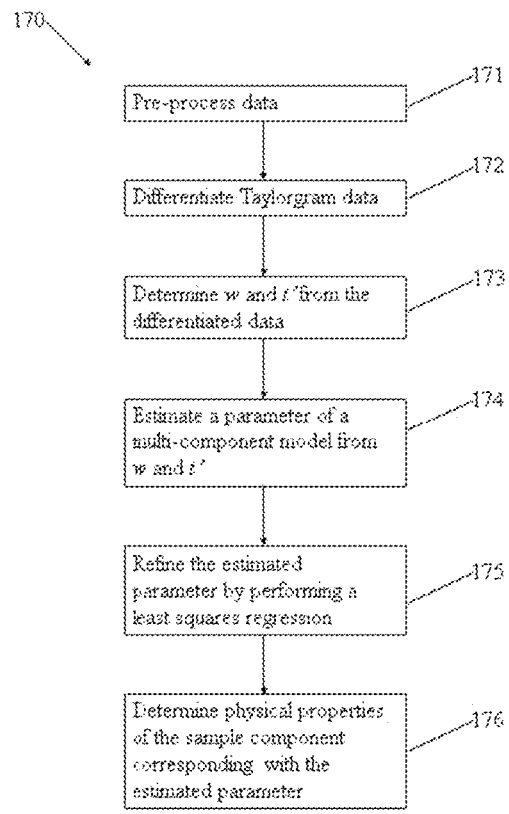
FIG. 9 is flow diagram of a method in accordance with a further embodiment.

Referring to FIG. 9, a flow diagram 170 of a method is shown, comprising:
171, optionally, pre-process data;
172, differentiate Taylorgram data;
173, determine w and t' from the differentiated data;
174, estimate a parameter of a multi-component model from w and t';
175, optionally, refine the estimated parameter by performing a least squares regression;
176, optionally, determine physical properties of the sample component corresponding with the estimated parameter.

Two or Three Components with Known Size Ratios

In this case, there is only one unknown width since the other one (or two in the case of three components) is related by a ratio known a priori. For the case of three components, there are three unknown amplitudes and one unknown size or width. Hence, with the corresponding four equations (cf. Equations 8-11), the four unknowns ($A_1$, $A_2$, $A_3$ and $\sigma_1$) can be solved for:

$$x = A_1 + A_2 + A_3 \quad \text{(Equation 34)}$$

$$y = \frac{A_1}{\sigma_1^2} + \frac{A_2}{a\sigma_1^2} + \frac{A_3}{b\sigma_1^2} \quad \text{(Equation 35)}$$

$$z = A_1 \sigma_1 + A_2 \sqrt{a}\, \sigma_1 + A_3 \sqrt{b}\, \sigma_1 \quad \text{(Equation 36)}$$

$$u = A_1 \sigma_1^2 + A_2 a \sigma_1^2 + A_3 b \sigma_1^2 \quad \text{(Equation 37)}$$

where a and b are the known size ratios of the second and third components to the first component respectively.

These simultaneous equations can be reduced to a single quartic equation in $\sigma_1$ which can be solved using well known methods. From this solution, estimates can then be made for $A_1$, $A_2$ and $A_3$ by substitution. A similar solution can be obtained for a mixture of two components by solving any three of the four corresponding equations.

Two, Three of Four Components with Known Sizes

In this case, since the sizes (and hence the widths) are known, the only unknowns are the amplitudes. Hence, for the general case, the four equations (8-11) can be solved for the n unknowns ($A_n$) by reducing them to a matrix equation.

The following is the equation applicable to n=4 components:

$$\begin{bmatrix} 1 & 1 & 1 & 1 \\ 1/\sigma_1^2 & 1/\sigma_2^2 & 1/\sigma_3^2 & 1/\sigma_4^2 \\ \sigma_1 & \sigma_2 & \sigma_3 & \sigma_4 \\ \sigma_1^2 & \sigma_2^2 & \sigma_3^2 & \sigma_4^2 \end{bmatrix} \begin{bmatrix} A_1 \\ A_2 \\ A_3 \\ A_4 \end{bmatrix} = \begin{bmatrix} x \\ y \\ z \\ u \end{bmatrix} \quad \text{(Equation 38)}$$

where $\sigma_1$, $\sigma_2$, $\sigma_3$ and $\sigma_4$ are known a priori (determined from Equation 4). This can then be solved by well-known matrix methods to obtain initial estimates for $A_1$, $A_2$, $A_3$, and $A_4$. Note that for two- (and three-) component mixtures a 2 by 2 (and 3 by 3) matrix constructed from any two (and three) of the four equations can be used to obtain initial estimates.

Apparatus

Figure 10:
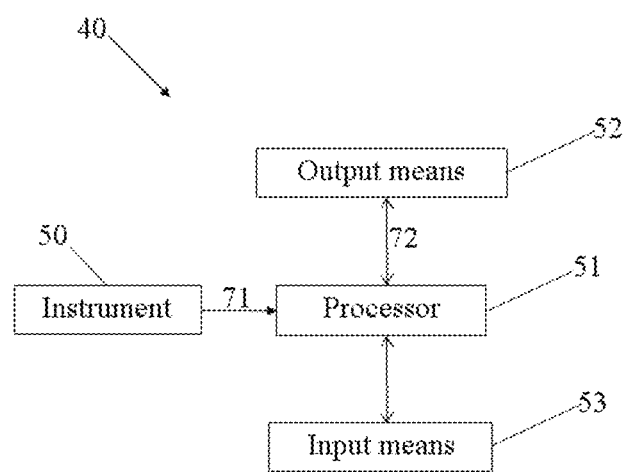
FIG. 10 is schematic block diagram of an apparatus according to an embodiment.

Referring to FIG. 10, an apparatus 40 is shown in accordance with an embodiment. The apparatus 40 comprises an instrument 50, processor 51, output means 52 and input means 53. The instrument 50 is operable to perform a Taylor dispersion analysis on a sample, so as to produce Taylorgram data 71. The processor 51 is configured to estimate parameters for fitting a multi-component Gaussian model to the Taylorgram data 71, in accordance with an embodiment (for instance as described above). The processor 51 may provide an output 72 to the output means 52, which may comprise a display or printer. The output 72 may comprise model parameter estimates, and/or estimates of the properties of the sample analysed by the instrument 50, based on a model fitted to the data 71 by the processor 51. The processor 51 may be configured to use estimated model parameters (determined according to an embodiment) as a starting point for a numerical search for a best fit to the Taylorgram data 71 (for instance via regression analysis based on least squares). An input means 53 may be provided for controlling the processor 51 and/or instrument. The input means 53 may comprise a keyboard, mouse or other suitable user interface device.

Figure 11:
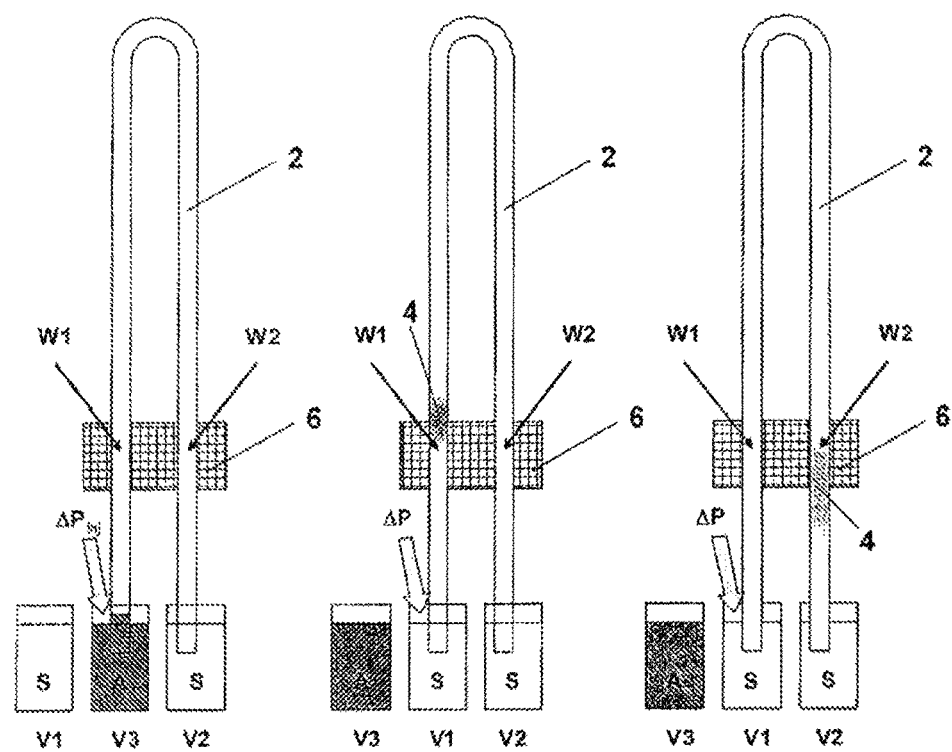
FIG. 11 is a schematic block diagram of an apparatus for obtaining Taylorgram data from a sample according to an embodiment.

Referring to FIG. 11, three views of an instrument 50 according to an embodiment is shown. The instrument 50 comprises a capillary 2 linking two containers V1 and V2. Liquid is driven (e.g. at constant pressure) from V1 to V2. Container V1 contains a run (or carrier) solution S so that the capillary 2 is initially filled with the run solution. Container V1 is then disconnected from the capillary 2, and a third container V3 is connected that contains a sample solution, A. The sample A may be a pharmaceutical or biopharmaceutical species dissolved either in the run/carrier solution S, or in a different medium SI. SI may differ from S in having an excipient, e.g. a salt or a sugar, dissolved at a different concentration than in S. This is may be appropriate in formulations which are designed to stabilise active drug species.

Windows W1, W2 are spaced apart along the length of the capillary 2 between the containers V1, V2. The capillary 2 may be formed in a loop so that both windows W1, W2 may be imaged using a single optical assembly, for instance by arranging for them to be adjacent to one another in an area imaged by the pixel array of an area imaging detector 6. In other embodiments, a single window may be used, or the detector 6 may comprise a single element, rather than a pixel array.

To inject a plug of the sample A into the capillary 2 the third container V3 may be connected to the capillary 2 and then disconnected after a suitable volume of the sample A has been injected under pressure. The second container V2 is connected the capillary when the third container V3 is disconnected from the capillary 2. The detector 6 captures a frame sequence comprising measures of the received light intensity at the detector 6 as the pulse of sample solution 4 or the flow front passes through each window W1, W2. The detector output thereby provides data on absorbance versus time: a Taylorgram.

Figure 12:
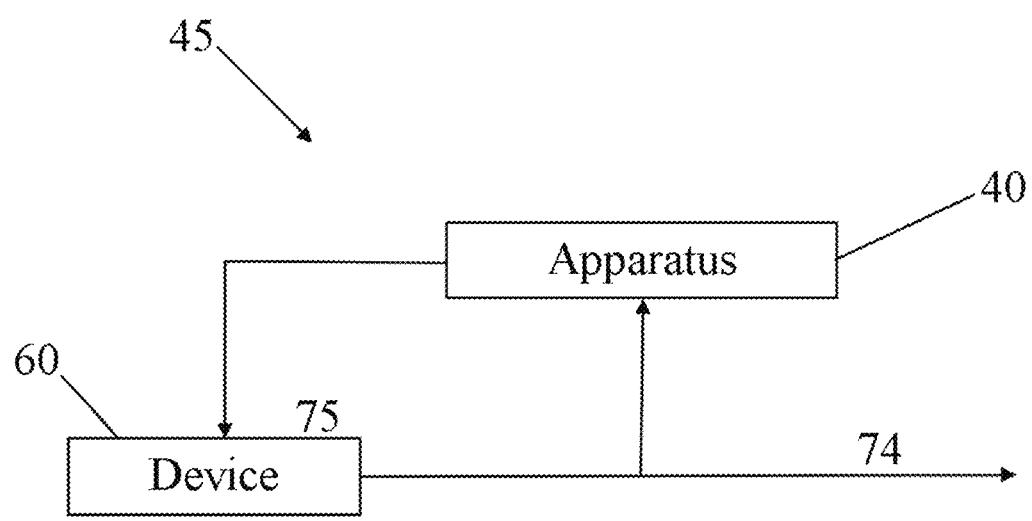
FIG. 12 is a schematic block diagram of apparatus for preparing a product, while monitoring a level of aggregation of a component of the product.

FIG. 12 schematically illustrates apparatus 45 for making a product 74. The apparatus 45 comprises a device 60 for producing a product 74. The device 60 may be a reactor, and the product 74 may be a medicament and/or a biopharmaceutical product. The product 74 output from the device 60 is sampled by apparatus 40, which performs a Taylor dispersion analysis to investigate the components within the product 74. Operating parameters 75 of the device 60 may be adjusted based on an output signal from the apparatus 40. For instance, the apparatus 40 may monitor the degree of aggregation in the product 74, and adjust the device 60 so as to maintain a desired level of aggregation (e.g. below/above a threshold, or within a range).

EXAMPLES

Two-Component Mixtures

Three different combinations of two-component mixtures were prepared and analysed with the Malvern Instruments® Viscosizer®. They were prepared from caffeine ($R_h$~0.332 nm), BSA ($R_h$~3.8 nm), Myoglobin ($R_h$~2.1 nm) and IgG ($R_h$~5.8 nm) dissolved in a PBS buffer solution. Multi-component models were fitted to the Taylorgram data obtained from the analyses, according to: i) the prior art, using least squares regression analysis based on pseudo-random initial parameters; and ii) using least squares regression analysis, starting from parameter estimates generated in accordance with an embodiment. In each case, the models were generated without a priori knowledge of: the relative concentrations of the two components in the sample, and the hydrodynamic radius of the two components in the sample.

The mixtures were:
1. Caffeine and BSA (shown in FIGS. 13 and 14);
2. BSA and myoglobin (shown in FIGS. 15 and 16);
3. Myoglobin and IgG (shown in FIGS. 17 and 18).

The instrument includes two measurement locations, which have two different corresponding residence times, and hence two sets of Taylorgram data per analysis are generated. Models can be fitted independently to the output from either sensor location, or based on minimising the errors from both sets of data based on common model parameters.

Figure 13:
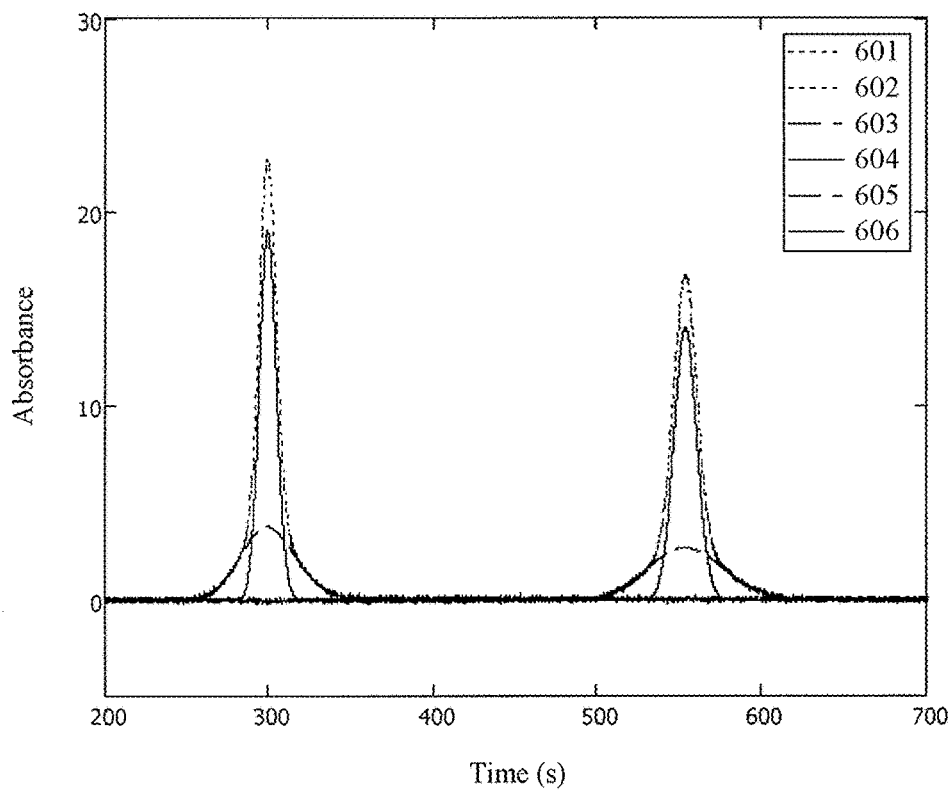
FIG. 13 is graph of: Taylorgram data for a sample comprising a mixture of caffeine and BSA; and a model fitted to the data based on parameter estimates produced according to an embodiment.
Figure 14:
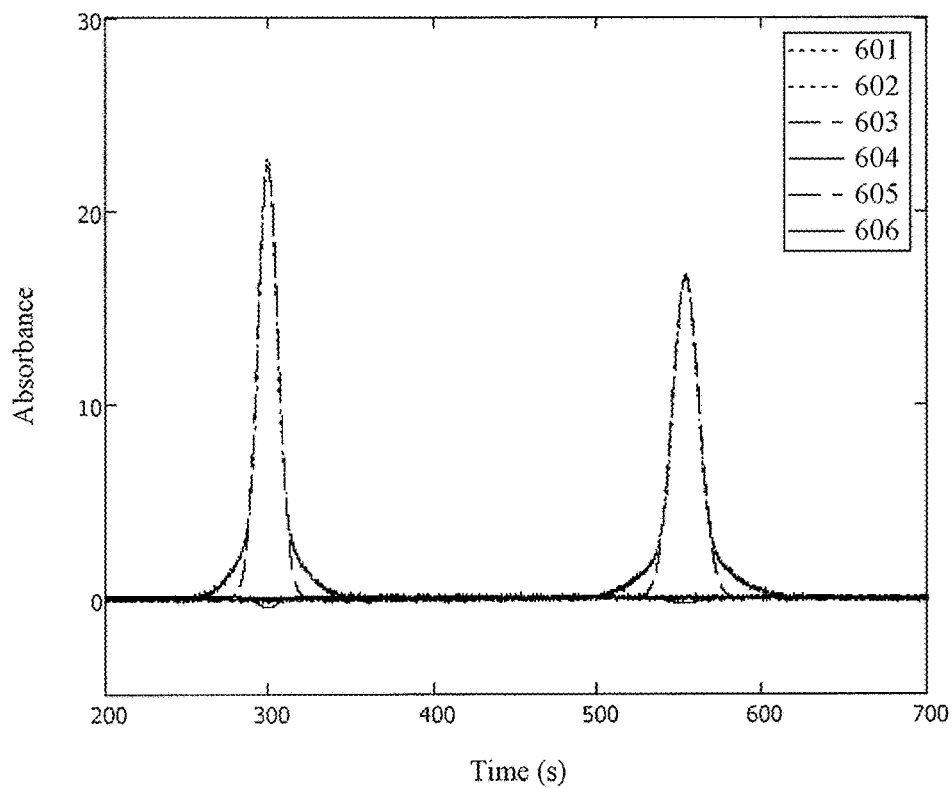
FIG. 14 is a graph of: the Taylorgram data of FIG. 13 and a model fitted to the data according to the prior art.

FIG. 13 shows Taylorgram data 601, 602 obtained for a sample comprising caffeine and BSA at the first and second location respectively. The first model component 604, 606 and second model component 603, 605 obtained based on parameter estimates determined in accordance with an embodiment are overlaid on the data 601, 602. In order to avoid obscuring the data 601, 602 the combined model is not shown, but the fit is excellent. The contribution of the second model component 603, 605 is significant. Referring to FIG. 14, subjecting the same data to least squares analysis based on pseudo-random starting values for the parameters results in a poor quality model. Least squares regression of a multi-component Gaussian distribution is an ill-conditioned problem, which is difficult to solve by regression alone.

Figure 15:
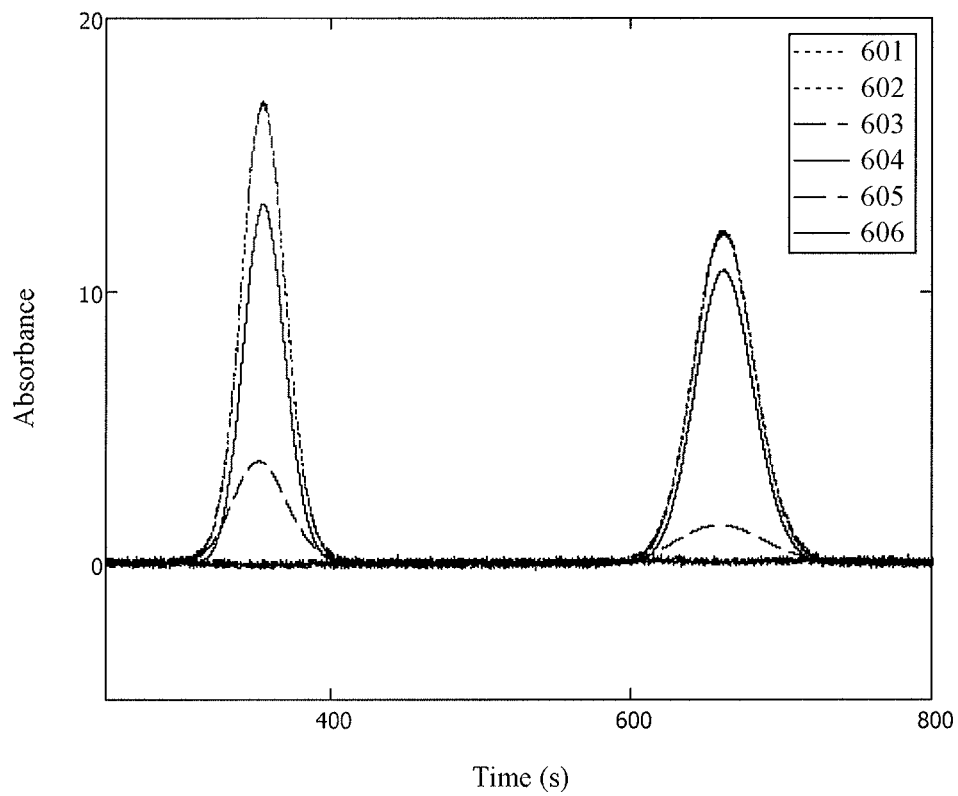
FIG. 15 is graph of: Taylorgram data for a sample comprising a mixture of BSA and myoglobin; and a model fitted to the data based on parameter estimates produced according to an embodiment.
Figure 16:
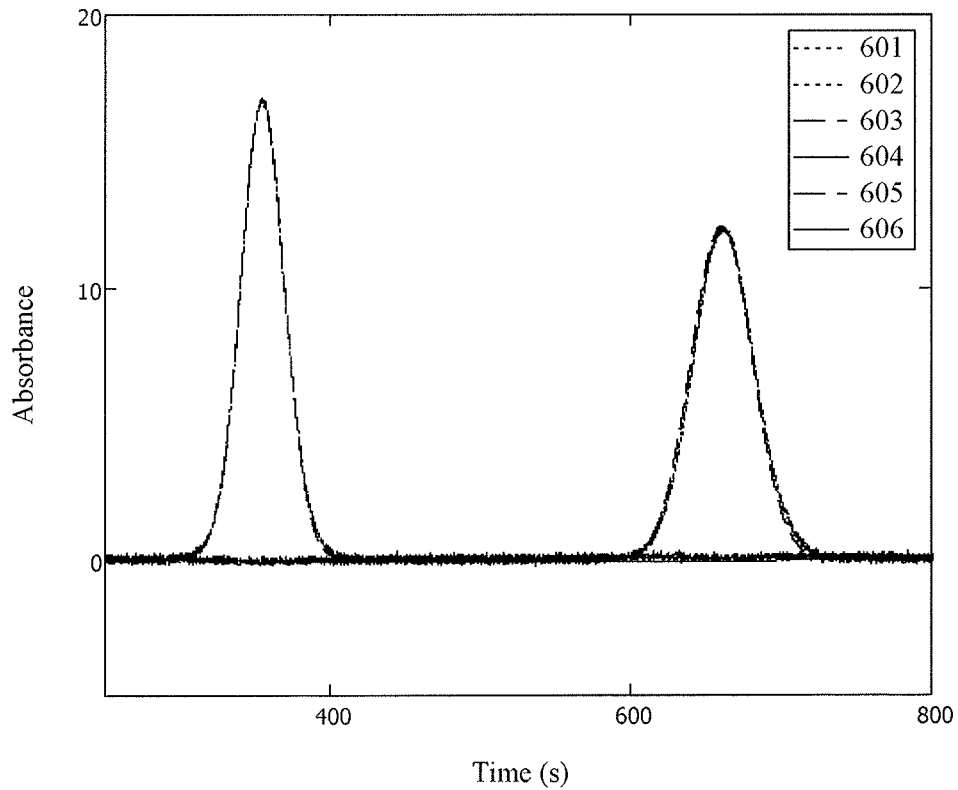
FIG. 16 is a graph of: the Taylorgram data of FIG. 15 and a model fitted to the data according to the prior art.

FIG. 15 shows Taylorgram data 601, 602 obtained for a sample comprising BSA and myoglobin at the first and second location respectively. The first model component 604, 606 and second model component 603, 605 obtained based on parameter estimates determined in accordance with an embodiment are overlaid on the data 601, 602. Again the fit is excellent, and the contribution of the second component 603, 605 is significant. Referring to FIG. 16, subjecting the same data to least squares analysis based on pseudo-random starting values for the parameters results in a deceptively good fit to the Taylorgram, that is actually incorrect. The hydrodynamic radius for the first component estimated from this model would be incorrect by a significant margin, and the amplitude of the second component has been significantly underestimated.

Figure 17:
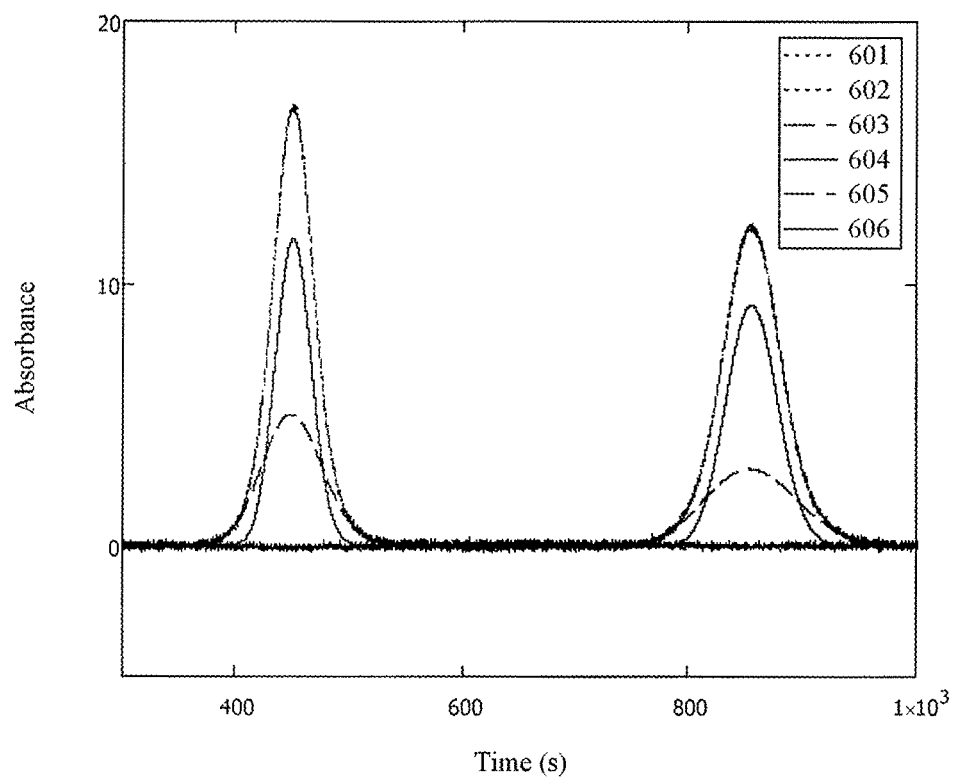
FIG. 17 is graph of: Taylorgram data for a sample comprising a mixture of myoglobin and and immunoglobulin G (IgG); and a model fitted to the data based on parameter estimates produced according to an embodiment.
Figure 18:
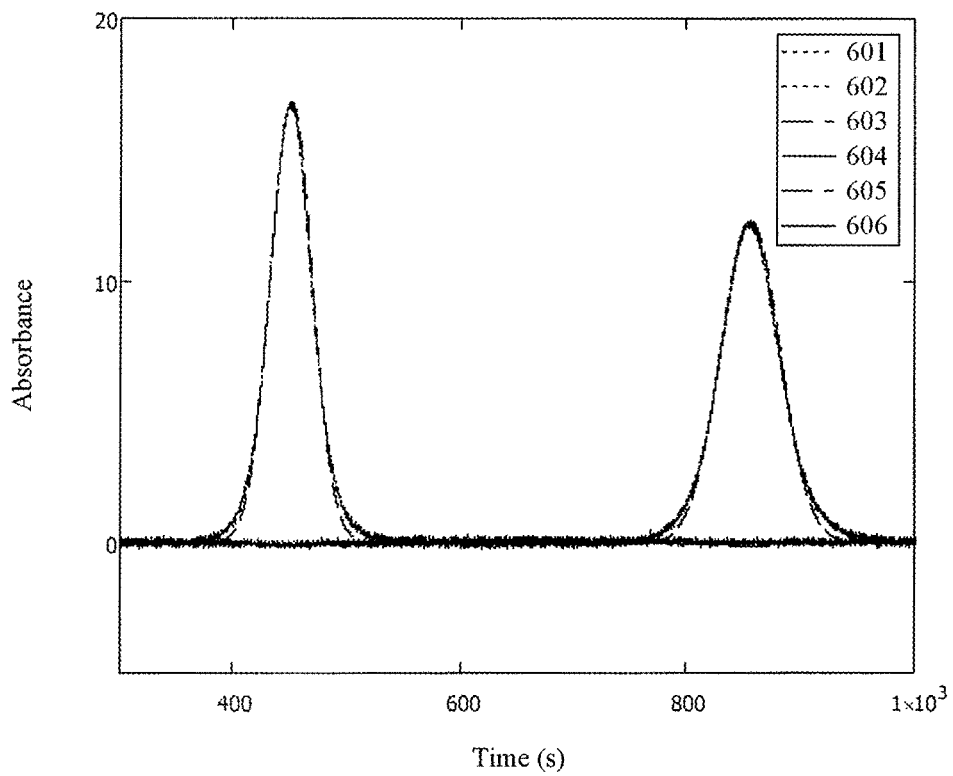
FIG. 18 is a graph of: the Taylorgram data of FIG. 17 and a model fitted to the data according to the prior art.

FIG. 17 shows Taylorgram data 601, 602 obtained for a sample comprising Myoglobin and IgG at the first and second location respectively. The first model component 604, 606 and second model component 603, 605 obtained based on parameter estimates determined in accordance with an embodiment are overlaid on the data 601, 602. Again the fit is excellent, and the contribution of the second component 603, 605 is significant. Referring to FIG. 18, subjecting the same data to least squares analysis based on pseudo-random starting values for the parameters again results in a fairly good fit to the Taylorgram that is incorrect. The hydrodynamic radius for the first component estimated from this model would be incorrect, and the amplitude of the second component has been significantly underestimated.

Table 1 below illustrates the accuracy obtained by using parameter estimates in accordance with an embodiment.

TABLE 1

Results for the hydrodynamic radii obtained from the two-component fits

| Mixture (3 measurements of each) | Average Rh of $1^{st}$ component/nm | Average Rh of $2^{nd}$ component/nm |
|---|---|---|
| Caffeine (0.33 nm) BSA (~3.6 nm) | 0.34 | 3.6 |
| BSA (~3.6 nm) Myoglobin (~2.1 nm) | 3.7 | 2.1 |
| Myoglobin (~2.1 nm) IgG (~5.7 nm) | 2.0 | 5.8 |

The hydrodynamic radii determined based on the parameter estimates are in good agreement with the known hydrodynamic radii of the mixtures.

Buffer Mismatch with Unknown Sample

Figure 19:
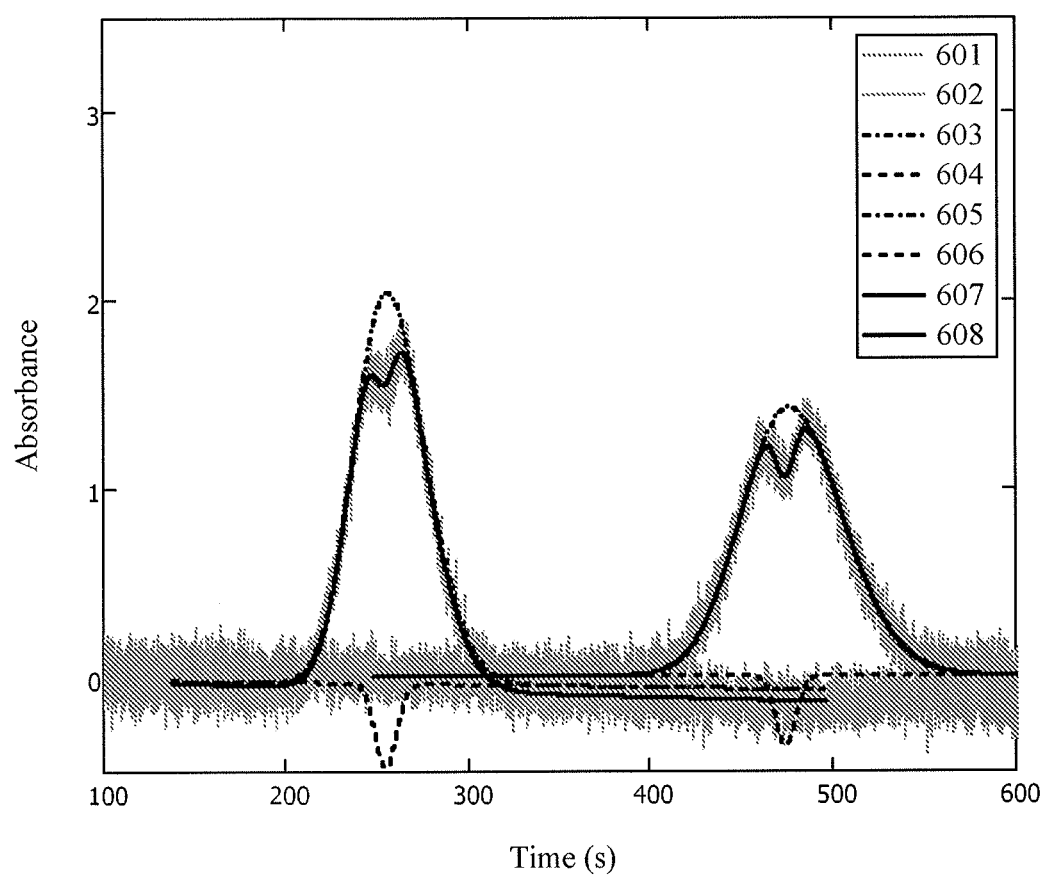
FIG. 19 is a graph of: Taylorgram data for IgG samples in a phosphate buffered saline (PBS) buffer, in which there is a mismatch in buffer concentration between the sample buffer and run buffer; and a model fitted to the data based on parameter estimates produced according to an embodiment.

FIG. 19 shows Taylorgram data 601, 602 obtained by performing a Taylor dispersion analysis on a sample comprising IgG dissolved in a PBS buffer. A buffer mismatch was deliberately introduced between the sample and run buffer, so that the change in concentration of the buffer results has an effect on the Taylorgram data.

Model parameters were estimated in accordance with an embodiment, and used as a starting point for a least squares regression analysis to fit model parameters to the data. The first component 603, 605 of each fitted model (corresponding with the IgG component of the sample), the second component 604, 606 of each fitting model (corresponding with the buffer mismatch) and the combined models 607, 608 are shown in FIG. 19. There is a striking match with the data, and the influence of the buffer mismatch has been effectively removed. This demonstrates the ability of embodiments to enable reliable and accurate estimates for sample properties to be provided, even in challenging measurement conditions. Table 2 shows the average hydrodynamic radii obtained from analysing four Taylor dispersion analyses.

TABLE 2

Results for the hydrodynamic radii obtained from fits to buffer mismatches

| Sample and buffer (4 measurements) | Average Rh (IgG)/nm | Average Rh (Buffer)/nm |
|---|---|---|
| IgG (~5.7 nm) in PBS buffer | 5.8 | 0.24 |

The analysis was performed without a priori knowledge of the IgG component or the buffer mismatch.

A Mixture of Two Components with Known Sizes

When dissolved in a PBS buffer solution, the hydrodynamic radii of immunoglobin (IgG) monomers and dimers are 5.2 nm and 7 nm respectively. In order to determine the relative proportions of the oligomers in a sample of IgG, three Taylorgrams were obtained and fitted with initial parameter estimates generated by fixing the component sizes and hence their pseudo-Gaussian widths, in accordance with an embodiment. The areas under each component fit were then calculated to obtain the relative proportions of the monomer and dimer in the sample.

Figure 20:
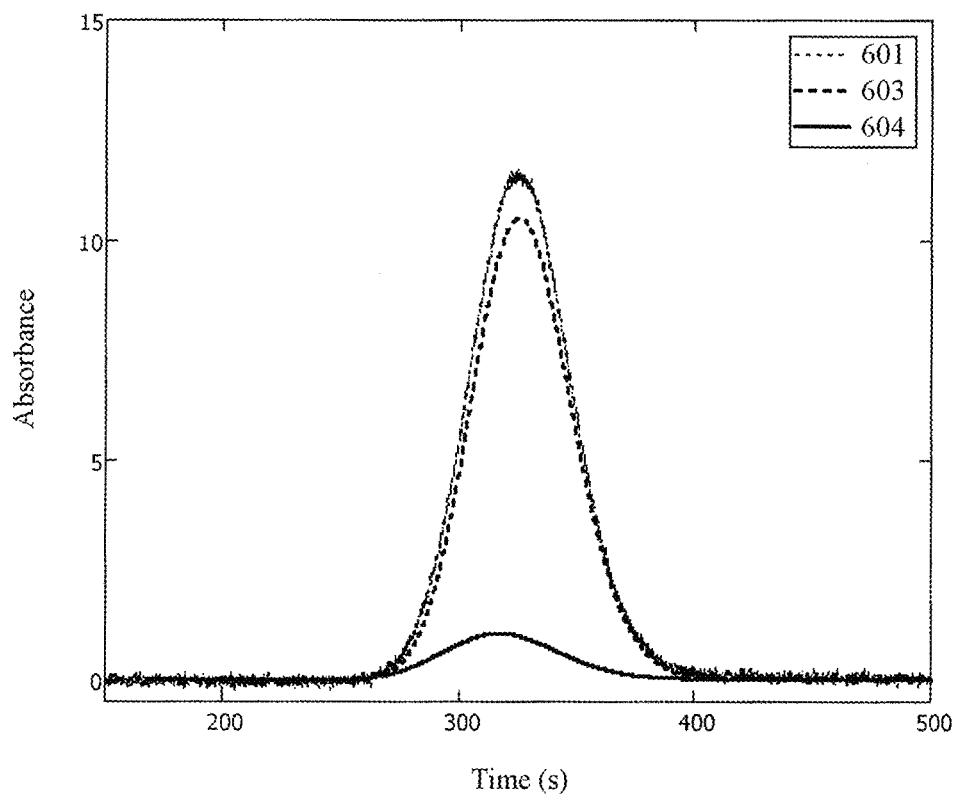
FIG. 20 is a graph of: Taylorgram data for a sample comprising a mixture of IgG monomers and dimers; and a model fitted to the data based on parameter estimates produced according to an embodiment.

FIG. 20 shows an example of a model fit obtained based on parameter estimates generated in accordance with an embodiment. The Taylorgram data 601 is shown with the first model component 603 and second model component 604. The average proportions obtained from three such analyses are presented in Table 3.

| IgG (3 measurements) | Average monomer proportion/% | Average dimer proportion/% |
|---|---|---|
| Monomer (5.2 nm), dimer(7 nm) | 89 | 11 |

Figure 21:
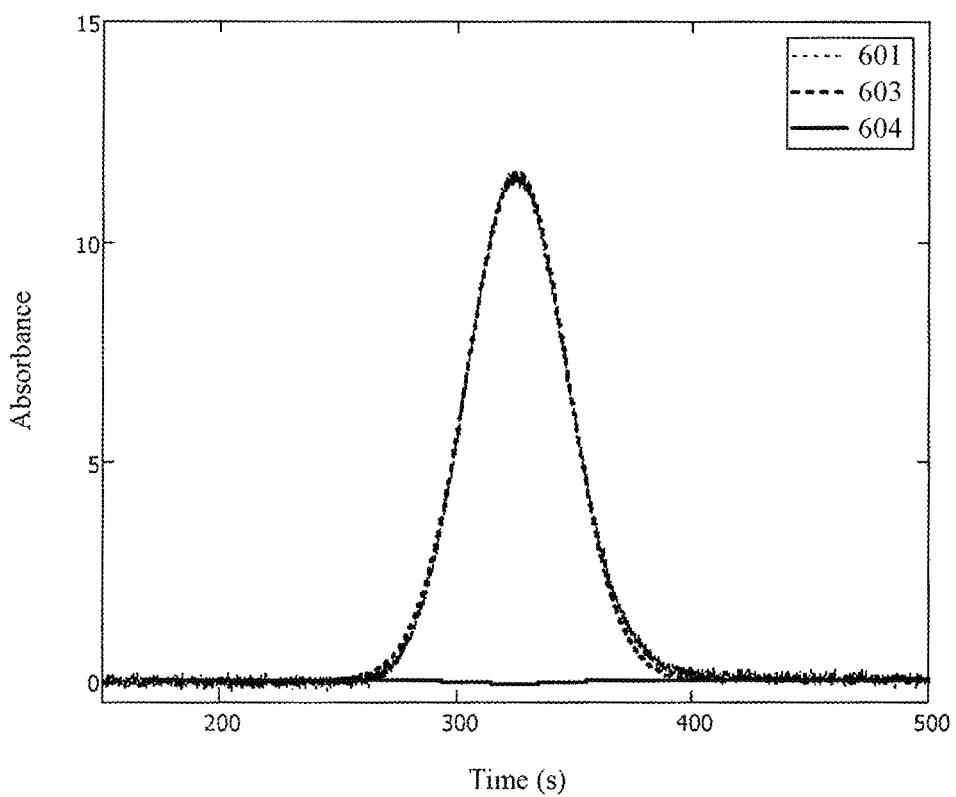
FIG. 21 is a graph of: the Taylorgram data of FIG. 20 and a model fitted to the data according to the prior art.

For comparison, a fit obtained with no predetermined estimates (i.e. pseudo-random) is shown in FIG. 21, where the best fit was a model with a negative amplitude for the second component.

Embodiments of the invention have been described that solve a number of important problems in sample characterisation. Embodiments of the invention make Taylor dispersion analysis a more viable option for characterisation of aggregates in formulations (e.g. biopharmaceutical formulations).

Although the examples have generally been illustrated with respect to a pulse Taylorgram, the skilled person will appreciate that a similar approach can be applied to the case where the Taylorgram mode corresponds with a slug Taylorgram (as described by Equation 3). The applicable equations for a slug Taylorgram are more lengthy, but are straightforward to generate, for instance using software such as Wolfram Mathematica.

A number of variations are possible, within the scope of the invention, as defined by the appended claims.

The invention claimed is:

1. A method of estimating a diffusion coefficient or hydrodynamic radius of a sample by:
    performing a Taylor dispersion analysis, wherein performing the Taylor dispersion analysis comprises:
        flowing a carrier solution through a capillary;
        injecting a sample fluid into the capillary to form a sample plug or a sample front;
        determining Taylorgram data by measuring absorbance over time at a detector as the sample plug or sample front flows past the detector; and using a computer to fit a multi-component Taylorgram model to the Taylorgram data g(t) obtained from the sample, the Taylorgram data comprising a multi-component Taylorgram peak or front at $t=t_r$; the method comprising:

evaluating a value of an integration or a differential of the data;

determining the diffusion coefficient or hydrodynamic radius of a component of the multi-component Taylorgram model, based on an analytical expression that includes the value of the integral or differential of the data, the diffusion coefficient or hydrodynamic radius corresponding with a physical property of a component of the sample from which the Taylorgram data was obtained;

determining a maximum value, w, of a differential of the data, $$\frac{dg(t)}{dt},$$

and a value t' corresponding with the maximum value, w; and determining the diffusion coefficient or hydrodynamic radius from the values w, t' and $t_r$.

2. The method of claim 1, wherein evaluating a value of an integration or a differential of the data comprises evaluating at least one of: a first differential of the data, a second differential of the data, a third differential of the data, a first integral of the data, a second integral of the data and a third integral of the data.

3. The method of claim 1, comprising:

evaluating, based on the data, at least two values selected from:

x, a value of the data at $t=t_r$;

y, a value of a second differential of the data, $$\frac{d_2g(t)}{dt^2},$$

at $t=t_r$;

z, a value derived from an integration of the data, $\int g(t)dt$, starting or ending at $t=t_r$; and u, a value of an integration of the integration of the data, $\iint g(t)dt^2$, starting or ending at $t=t_r$; and then determining an estimate for the diffusion coefficient or hydrodynamic radius, wherein determining the estimate comprises solving at least two simultaneous equations, the simultaneous equations each respectively comprising one of the evaluated values.

4. The method of claim 1, wherein the simultaneous equations comprise at least two of:

$$x = \sum_{i=1}^{n} A_i;$$

$$y = -\frac{d_2g(t)}{dt^2} = \sum_{i=1}^{n} \frac{A_i}{\sigma_i^2};$$

$$z = \sqrt{\frac{2}{\pi}} I = \sum_{i=1}^{n} A_i \sigma_i,$$

where I is a value of the integration of the data, $\int g(t)dt$, starting or ending at $t=t_r$; and $u = \sum_{i=1}^{n} A_i \sigma_i^2$.

5. The method of claim 4, wherein the model comprises a two-component Taylorgram model, and wherein at least one of the following conditions are met:

none of $A_1$, $A_2$, $\sigma_1$, $\sigma_2$ are known before the diffusion coefficient or hydrodynamic radius is estimated;

one of $\sigma_1$ and $\sigma_2$ are known, and none of the remaining parameters $A_1$, $A_2$, $\sigma_1$, $\sigma_2$ are known before the diffusion coefficient or hydrodynamic radius is estimated;

the second component has a negative amplitude $A_2$, and the amplitude of the second component $A_2$, is smaller than the amplitude of the first component $A_1$.

6. The method of claim 4, wherein:

i) the model comprises a two or three component Taylorgram model, and wherein a relationship between the values of $\sigma_i$ for the sample is known, and wherein the absolute values of $A_i$ and $\sigma_i$ for the sample are not known, and the ratio between the values of $A_i$ for the sample is not known; or ii) the model comprises a two, three or four component Taylorgram model, and wherein the values $\sigma_i$ for the sample are each known but the values of $A_i$ for the biopharmaceutical formulation are not known.

7. The method of claim 1, wherein the Taylorgram model is of the general form:

$$g_{model}(t) = \sum_{i=1}^{2} A_i \cdot e^{-0.5 \left(\frac{t-t_r}{\sigma_i}\right)^2};$$

the diffusion coefficient or hydrodynamic radius is selected from $A_r$ and $\alpha_r$; and the second component has a negative amplitude $A_2$, and the magnitude of the amplitude of the second component $A_2$, is smaller than the magnitude of the amplitude of the first component $A_1$.

8. The method of claim 7, wherein the diffusion coefficient or hydrodynamic radius is determined based on at least one of the expressions:

$$w = \frac{A_1}{\sigma_1} e^{-0.5}; \text{ and}$$

$$t' = t_r \pm \sigma_1.$$

9. The method of claim 8, wherein a further parameter of the model is determined based on at least one of the expressions:

$$z = \frac{A_1}{\sigma_1^2} + \frac{A_2}{\sigma_2^2}, \text{ and } x = A_1 + A_2.$$

10. An apparatus comprising a processor, configured to perform the method of claim 1.

11. The apparatus of claim 10, further comprising an instrument for performing a Taylor dispersion analysis, so as to obtain the data.

12. The method of claim 1, further comprising performing a measurement on the sample to obtain the Taylorgram data.

13. A method of estimating a diffusion coefficient or hydrodynamic radius of a sample by:
performing a Taylor dispersion analysis, wherein performing the Taylor dispersion analysis comprises:
flowing a carrier solution through a capillary;
injecting a sample fluid into the capillary to form a sample plug or a sample front;
determining Taylorgram data by measuring absorbance over time at a detector as the sample plug or sample front flows past the detector; and
using a computer to fit a two-component Taylorgram model to the Taylorgram data g(t), the data being a Taylorgram obtained from the sample comprising a multi-component Taylorgram peak or front at $t=t_r$, the method comprising:
performing a least squares fit of a single component Taylorgram model to the data g(t);
determining the diffusion coefficient or hydrodynamic radius by finding a root of a cubic equation, the cubic equation derived from: an analytical expression for the integrated residual squared error, $R^2$, resulting from a fit of a one-component Taylorgram model to a two-component Taylorgram distribution; and a priori knowledge of the standard deviation, $\alpha$, of a dominant Taylorgram component of the data g(t);
and,
wherein the two-component Taylorgram model is of the general form:

$$g_{model}(t) = \sum_{i=1}^{2} A_i \cdot e^{-0.5 \left(\frac{t-t_r}{\sigma_i}\right)^2};$$

and,
the cubic equation is:

$$a \cdot s_2^3 + b \cdot s_2 + c = 0, \text{ where}$$

$$s_2 = \frac{\sigma_2}{\sqrt{\sigma_2^2 + \sigma_s^2}};$$

$$a = 2\left(A_{peak} \frac{\sigma_1}{\sqrt{\sigma_1^2 + \sigma_s^2}} - A_s\right);$$

$$b = A_s - 2A_{peak}\left(\frac{\sigma_1}{\sqrt{\sigma_1^2 + \sigma_s^2}}\right)^3; \text{ and}$$

$$c = A_s\left(2\left(\frac{\sigma_1}{\sqrt{\sigma_1^2 + \sigma_s^2}}\right)^3 - \frac{\sigma_1}{\sqrt{\sigma_1^2 + \sigma_s^2}}\right).$$

14. A non-transitory computer readable medium, containing a set of instructions that are operable to cause a computer to perform the method of claim 13.

15. The method of claim 13, further comprising performing a measurement on the sample to obtain the Taylorgram data.

* * * * *